Dec. 5, 1967     G. O'NEAL, JR     3,356,820
WELD OVERRIDE TIMER
Filed Aug. 29, 1963
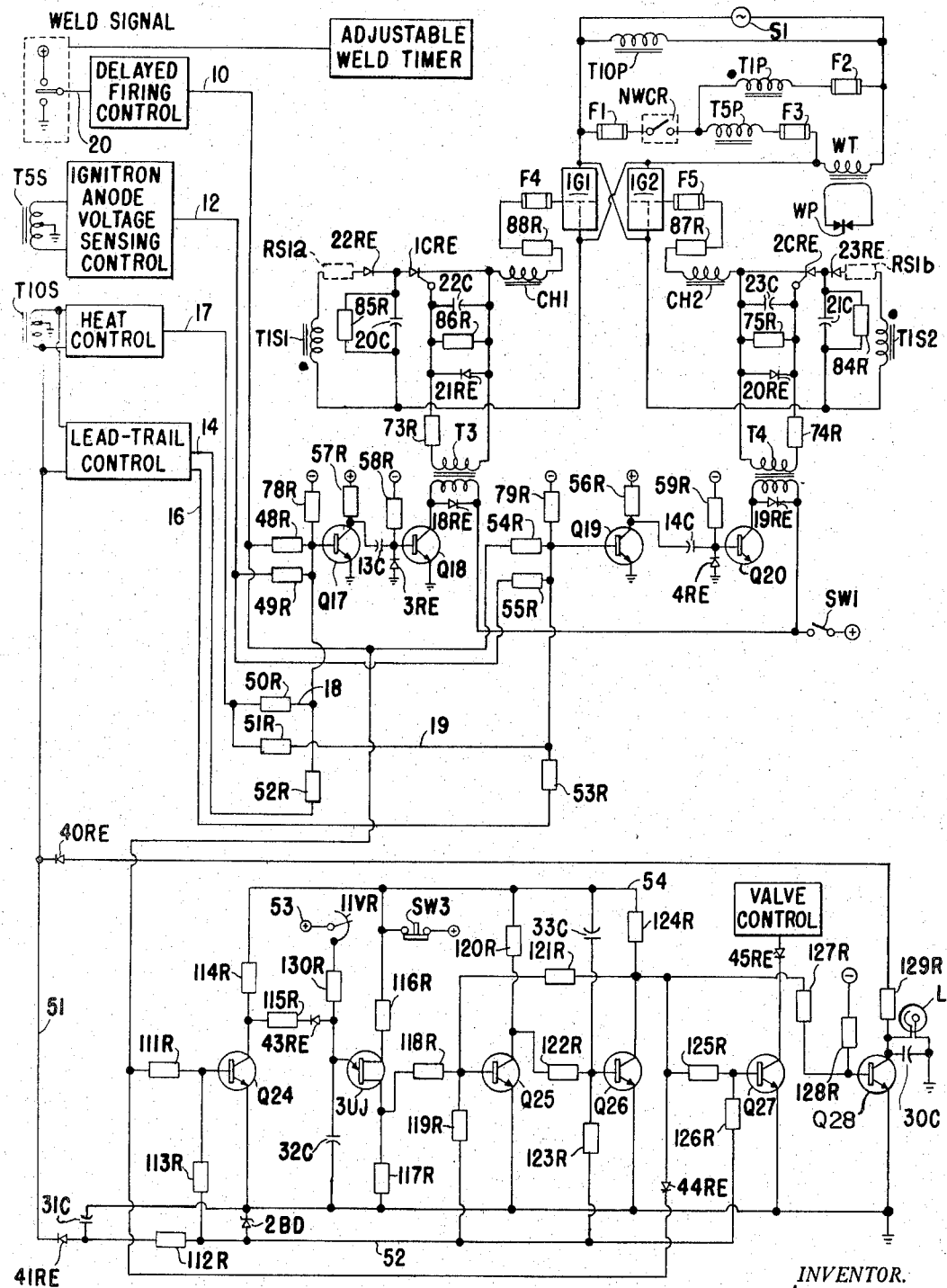
INVENTOR.
GEORGE O'NEAL JR.
BY
Marshall, Wilson & Yeasting
—attorneys—

United States Patent Office 3,356,820
Patented Dec. 5, 1967

3,356,820
WELD OVERRIDE TIMER
George O'Neal, Jr., Detroit, Mich., assignor to Weltronic Company, Southfield, Mich., a corporation of Michigan
Filed Aug. 29, 1963, Ser. No. 305,314
14 Claims. (Cl. 219—114)

ABSTRACT OF THE DISCLOSURE

A control for limiting the interval of a timed operation to an interval somewhat in excess of that desired for the operation, whereby the operation is terminated by an overriding control in the event it continues a brief interval beyond the desired time interval. Termination of the timed operation within the desired interval resets the control. As applied to weld timers having a range over which the weld interval can be adjusted, the overriding timer is adjustable in conjunction with the weld timer to impose a limiting interval of slightly greater length than the weld interval for all settings of the weld interval.

---

This invention relates to controls and more particularly to override controls for insuring the termination of the operation of controlled apparatus when such operation exceeds limits defined by the primary controls of the apparatus.

With the advent of control circuits employing solid state devices as the active control elements conditions have been encountered where the control elements fail in either the conducting or the non-conducting state. Heretofore the failure of electron discharge devices has been to the nonconducting state and therefore controls employing such elements could be arranged to "fail safe." However, in certain instances where solid state control elements are employed, a failure of an element to the conducting state can not be arranged to cause a "fail safe" operation.

In accordance with the above, the present invention contemplates a superseding or overriding control to terminate an operation where the normal control function has failed to occur. The override control establishes a limit, an interval, somewhat in excess of the normal control limit beyond which the apparatus can not continue the function, where a time limit is employed the time interval can be measured from the initiation of the function being controlled and, upon expiration of that override interval, terminates the function. As a safety control the override control ordinarily will not be required to operate since the normal controls will cause termination of the function to be controlled, hence the override control is reset automatically at the end of each normal cycle of the function.

According to the above one object of this invention is to improve the reliability of controls.

A second object is to terminate the operation of apparatus when that operation continues for a predetermined interval.

A third object is to avoid altering the normal operation of apparatus while imposing limits on the abnormal operation.

A fourth object as applied to welding controls is to develop a turn off signal for welding equipment shortly after the welding function is or should be completed.

Another object is to override detrimental malfunctions in control circuits employing solid sate elements as the active control elements.

One feature of the invention resides in a timing circuit which tracks with a primary timing control to define an interval slightly in excess of that adjusted in the primary control over the range of adjustment of that interval.

Another feature involves deriving a control signal for the override control from the input control to the apparatus to which the override control is applied to start a timing operation therein, and to issue a control signal to the apparatus at that input when the override interval has expired.

A further feature comprises adjustable timing means which can be reset rapidly from any intermediate point in its timing cycle and which requires some extraordinary resetting operation if its interval is permitted to expire.

As applied to a resistance welding control one illustrative embodiment of the invention comprises a timer which begins to measure an interval slightly exceeding the interval called for by weld time controls when a firing signal is issued to the switching devices for the weld current. That timer is adjustable with the weld heat interval timer to define an override interval exceeding the weld heat interval over the entire range of the weld heat interval. Once the override interval has expired as where the weld heat timer failed to stop the flow of welding current in the interval for which it was set, a bistable flip flop circuit is actuated to establish and hold a "no weld" signal on the welding equipment, to release the welding electrodes from the work piece, and to operate an override indicator. A manual reset is provided which must be actuated before the welding can proceed further.

The above and additional objects and features of this invention will be more fully appreciated from the following detailed description when read with reference to the accompanying drawing showing a schematic diagram of a firing control for a pair of ignitrons feeding current to a welding transformer. In the drawing certain portions of the control are represented in block diagram form and an override circuit is shown in schematic form.

The override circuit of the present invention has been illustrated as an adjunct to a welding control system including a firing control as disclosed in detail in United States patent application Ser. No. 271,948 which was filed Apr. 10, 1963 for "Control Apparatus" in the name of George O'Neal, Jr. and including a timer which co-operates with the firing control to terminate the passing of welding current to the welding transformer WT by controlled contactor means such as ignitrons. The override circuit functions only in the event the controls fail to stop the welding current and in such event it turns the controlled contactors off.

For convenience of illustration, the transformer windings have been illustrated in the drawing in a way to best illustrate the functions of those transformers and consequently the primary and secondary windings are shown separated. Common prefix designations have been employed in each case, however, to permit identification of which secondary windings are associated with which primary windings. Additionally, in the drawing, the sources of direct voltage have been indicated by a circle bearing a sign indicative of the polarity of the source. It is to be understood that in each case the other terminal of the source is assumed to be connected to ground. For convenience and clarity, voltage values have been referred to in the following description. It is to be understood that they are but representative.

In general, the circuits illustrated on FIG. 1 comprise a pair of ignitrons IG1 and IG2 (or other controlled contactor means) for selectively connecting a source of energy S1 to a welding transformer WT for controlling the application of energy to a work piece WP which is to be welded. The ignitrons IG1 and IG2 are controlled by individual firing circuits including controlled rectifiers 1CRE and 2CRE. Those firing circuits are operated under the control of driving circuits including transistors Q17 and Q18, and transistors Q19 and Q20. Those driving circuits are, in turn, controlled by four separate circuits including a delayed firing system, an ignitron anode voltage sensing system, a lead-trail control circuit, and a heat control circuit.

The two ignitrons IG1 and IG2 are connected in back-to-back or antiparallel relationship between the source S1 and the primary winding of the welding transformer WT, in a manner well known in the art. The operation of these ignitrons is controlled by firing circuits including devices 1CRE and 2CRE. To effectively preclude dangerous premature firing of the ignitrons, switch NWCR is acutated to indicate that the apparatus is prepared for welding. In a common practice, welder control circuits include a timer having a relay, often referred to as the "no-weld control relay," which is actuated upon initiation of the squeeze interval provided the apparatus is otherwise in condition to weld, and it is contemplated that the switch NWCR illustrated in FIG. 1 of the drawing may, and normally will be, a contact of that or of a counterpart relay. The no-weld-control relay may well not operate at a point of zero line voltage and could result in a transient signal which would improperly actuate the firing circuit. The illustrated circuits obviate this possible malfunctioning.

When switch NWCR is closed, a circuit is completed from the source S1, through that switch and through fuses F1 and F2 to energize the transformer primary winding T1P, which is inductively coupled to secondary windings T1S1 and T1S2 of that transformer. Secondary windings T1S1 and T1S2 are connected in out-of-phase relationship and the phase relationships of the several windings of that transformer are indicated by the dot placed adjacent one end of each of the windings T1P, T1S1 and T1S2 to denote those winding ends which are of the same polarity at a given instant.

When the voltage across winding T1P is such that the left-hand end of that winding is positive relative to the right-hand end, for example, the voltage induced across secondary winding T1S2 is such that its upper end is positive relative to its lower end. Under that condition, current flows in a circuit including resistor RS1b and rectifier 23RE to charge capacitor 21C so that its upper electrode becomes positive relative to its lower electrode. As will be seen, the energy stored by capacitor 21C is utilized to fire ignitron IG2. Charging resistor RS1b may be provided as a separate element, but in a constructed embodiment of the invention, the effective resistance of the secondary winding T1S2 was found to be adequate and resistor RS1b is illustrated in dotted lines to connote that it represents the internal resistance of that winding.

It will be observed that during this same half cycle, the polarity of the voltage across secondary winding T1S1 is such that rectifier 22RE blocks current flow and hence capacitor 20C does not charge during this half cycle. However, during the subsequent half cycle, in which the polarity is reversed, capacitor 20C is charged in a manner similar to that above described in connection with capacitor 21C, in preparation for the firing of ignitron IG1.

Thus, at the end of one full cycle of the current from source S1 following the operation of switch NWCR, both capacitors 20C and 21C are charged in preparation for the operation of the system. Until they charge, the firing circuits cannot actuate the ignitrons. This one-cycle delay serves as a safety measure to insure that the welding electrodes will have engaged the workpiece before welding current is applied to the welding transformer. In the customary timers, squeeze time must be initiated before switch NWCR will close and the necessity of charging capacitors 20C and 21C in order to enable the firing circuits to fire the ignitrons IG1 and IG2 requires that the squeeze time be at least one cycle in duration.

In the preferred arrangement, capacitors 20C and 21C are made sufficiently large to store a substantial amount of energy which may be abruptly discharged through the input circuits of the ignitrons. Once those capacitors are charged, this energy is available for application to those circuits, but cannot be so applied until the control rectifier devices 1CRE and 2CRE have a suitable gating potential applied to their control electrodes or gates.

Means are provided for applying gating pulses to the silicon controlled rectifier devices 1CRE and 2CRE in selectable timed relation to the voltage applied to the anodes of the ignitrons. When the gating signal is applied to controlled rectifier 2CRE (during the half cycle of the source voltage in which the anode of ignitron IG2 is positive relative to its cathode), that rectifier is rendered conductive to establish a discharging path for capacitor 21C through that rectifier, inductor or choke CH2, resistor 87R, fuse F5, through the igniter-cathode path in tube IG2 and back to capacitor 21C. In the preferred arrangement, capacitors 20C and 21C are preferably of substantial capacitance (such as 20 microfarads) so that a substantial amount of energy can be delivered to the input circuits of the ignitrons. It is a characteristic of the preferred controlled rectifiers 1CRE and 2CRE that when conduction is initiated by virtue of the application of an input signal to their gates, the termination of the gating pulse will not in and of itself terminate conductivity of those devices.

In response to the signal applied to the input circuit of ignitron IG2, that ignitron will conduct between its anode and cathode, producing energization of the welding transformer WT from the source S1 and a resultant application of a pulse of energy to the workpiece WP. In a similar manner, ignitron IG1 is rendered conductive at a selectable point in that half cycle during which its anode is positive relative to its cathode to similarly energize transformer WT to apply a pulse of energy to the workpiece WP.

It will be observed that the firing energy storage means, such as capacitor 21C, together with the resistance in its charging circuit, such as the illustrated internal resistance RS1b of transformer winding T1S2, constitute a resistance-capacitance low-pass filter or integrating network. As a result, if the line voltage abruptly and transiently changes, tending to induce a transient voltage peak across secondary winding T1S2, that resistance-capacitance network will effectively suppress the voltage peak from appearing at the controlled rectifier device 2CRE and effectively preclude any such transient from producing a sufficient rate of change of current to cause that device improperly to become conductive.

It will further be noted that the circuit including choke CH2 and the resistance in the discharging circuit for capacitor 21C, including resistor 87R, constitute a filter for limiting the rate of change of the discharge current of capacitor 21C so as to limit the magnitude of the current in the input circuit of the ignitron.

Resistors 84R and 85R, which are connected in parallel with capacitors 21C and 20C, respectively, are preferably of sufficiently large resistance so that they do not significantly affect the normal operation of the circuit. In a practical embodiment, those two resistors were selected to have a value of about 50,000 ohms so that the network including the associated capacitor had a time constant of one second, which is large relative to the normal interval between the charging of the capacitor and the time at which the firing circuit will be triggered to apply the pulse of energy to the ignitron. However, at the termination of the operation, when switch NWCR is opened, those resistors serve to discharge their associated capacitor as a safety measure.

The gate signals for the controlled rectifier devices 1CRE and 2CRE are applied through pulse transformers T3 and T4, respectively. Any pulse appearing across the secondary winding of transformer T4, for example, which is of a polarity such that the left-hand end of that winding is positive relative to the right-hand end, is dissipated through rectifier 20RE and resistor 74R. A pulse of the opposite polarity is applied to the input or gate circuit of controlled rectifier 2CRE via resistor 74R to cause that device to apply a discharge pulse from capacitor 21C to the input circuit of ignitron IG2, as above described. The network comprising capacitor 23C and resistors 74R and 75R are elements of a circuit for filtering high-frequency spurious transients and for effectively preventing improper actuation of the controlled rectifier device by transients. The gating pulses applied through transformer T4 are of sufficient magnitude to produce gating of the device despite this filtering or desensitizing network. The other firing circuit operates in a similar manner.

The application of pulses to the pulse transformers T3 and T4 is controlled by the driving circuit comprising transistors Q17 and Q18 and the driving circuit comprising transistors Q19 and Q20, respectively. These driving circuits are controlled by a delayed firing system via conductor 10, by an ignitron anode voltage sensing system via a conductor 12, by a lead-trail control circuit which is connected to the two driving circuits via leads 14 and 16, respectively, and by a heat control circuit via conductor 17. As will be seen, in the illustrated arrangement, each of these leads may be at either of two selected voltages. In the illustrated arrangement these have been selected to be a positive voltage (such as positive 12 volts) and ground.

Conductor 10 is connected to the bases of transistors Q17 and Q19 through resistors 48R and 54R, respectively; conductor 12 is connected to the bases of those transistors through resistors 49R and 55R, respectively; conductor 14 is connected to the base of transistor Q17 through resistor 52R; conductor 16 is connected to the base of transistor Q19 through resistor 53R; and conductor 17 is connected to the bases of transistors Q17 and Q19 via resistors 50R and 51R, respectively.

The emitters of transistors Q17 and Q19 are grounded and their collectors are connected to a source of positive potential through load resistors 57R and 56R, respectively. Negative biasing voltages are applied to the bases of those transistors through resistors 78R and 79R, respectively. If any one of the conductors 10, 12, 14 or 17 is at the noted positive potential (assumed to be 12 volts), transistor Q17 is biased effectively to saturation, and similarly, if any one of the conductors 10, 12, 16 or 17 is at the noted positive potential, transistor Q19 is biased effectively to saturation. These input networks therefore constitute, in effect, "or" gates under which if any one of the noted conductors associated with transistors Q17 or V19 is at its positive potential or state, the associated transistor is biased effectively to saturation. Under that condition, the collector of that transistor is at a relatively low potential, herein assumed to be ground potential. However, at the instant that all of the noted conductors associated with the transistor concurrently reach the lower (ground) potential, the voltage at the base of that transistor drops sufficiently to render that transistor effectively non-conductive. For example, whenever all of the conductors 10, 12, 16 and 17 concurrently reach ground potential, transistor Q19 is rendered non-conductive and as a result a positive-going pulse is applied through the capacitor 14C to the base of transistor Q20. The emitter of transistor Q20 is grounded, and the collector is connected to a source of positive potential through the primary winding of transformer T4 and via switch SW1. The base is connected to a source of negative potential through resistor 59R. As a result of the application of the positive pulse to the base, transistor Q20 conducts current from the positive source through switch SW1, and through the primary winding of transformer T4 so that a pulse is induced in the secondary winding of that transformer. The shape and duration of the pulse which is applied to the base of transistor Q20, and hence the shape and duration of the pulse applied to the controlled rectifier device 2CRE via transformer T4 is controlled by means including resistor 56R, capacitor 14C and the resistance of the base of transistor Q20. Rectifier 4RE serves to prevent any substantial negative voltage from being applied to the base of transistor Q20. Rectifier 19RE serves to dissipate the voltage which is induced across the primary winding of transformer T4 upon the collapse of the magnetic field at the termination of conduction of transistor Q20 at the end of the pulse.

The driving circuit including transistors Q17 and Q18 operates in a similar fashion, producing a pulse of energy at transformer T3 in the event that and when the voltages on conductors 10, 12, 14 and 17 all reach their lower or ground potential. It will be noted that switch SW1 also controls the application of positive voltage to the collector of transistor Q18. This switch is provided as a further safety measure and preferably is a contact of or is controlled by the weld-no-weld switch customarily provided in resistance-welder timers and which must be closed in order for welding to proceed. Whenever that switch is open, the driving circuits are incapable of applying pulses through transformers T3 and T4 to the firing circuits.

The lead-trail circuit controls, via conductors 14 and 16, which of the two driving circuits and hence which of the two firing circuits can operate at any time, and alternately enables those circuits. This circuit is energized via a transformer, the primary winding T10P of which is illustrated to be connected across the source S1 and the secondary winding T10S of which appears at the lead-trail control block. When the upper terminal of the secondary winding T10S is positive with respect to the grounded center tap, which occurs when the left-hand terminals of source S1 and primary winding T10P are positive relative to their other terminals, current flows and the voltage drops from a positive level effectively to ground potential. This voltage is applied via conductor 14 and through resistor 52R to the base of transistor Q17 in the driving circuit associated with ignitron IG1. This is an enabling signal, which, other conditions met, will permit the firing circuit associated with ignitron IG1 to fire that ignitron, and it will be observed that this occurs during the half cycle in which the anode of ignitron IG1 is positive with respect to its cathode.

During the same half cycle, the lower terminal of transformer secondary T10S is negative with respect to ground and a positive voltage (e.g, 12 volts) is applied via conductor 16 and through resistor 53R to the base of transistor Q19 to disable that driving circuit and the firing circuit including controlled rectifier 2CRE to fire ignitron IG2.

The lead-trail control is arranged so that the potential on lead 14 is taken effectively to ground early in the half cycle of the line voltage approaching quite closely the zero-degree point and remains at that voltage throughout essentially the complete half cycle. During the alternate half cycle the control causes the potential on lead 14 to be positive.

The lead-trail control operates continuously whenever the source S1 is connected so as alternately to enable during successive half cycles the firing circuits associated with ignitrons IG1 and IG2. In order to control when welding occurs and additionally to provide a means for effectively preventing firing during the first half cycle thereafter so as to prevent saturation of certain types of welding transformer cores, a delayed firing system is provided. The delayed firing system is actuated by a weld signal applied to conductor 20. An appropriate signal is conventionally available in timers associated with present commercial welding equipment. This signal normally is applied when the timer has been set and desirably is synchronized with the voltage from source S1 so that the operating signal is both applied and removed at the zero degree points of the source voltage. In the illustrated arrangement, it is assumed that the weld signal applied to conductor 20 is at an appropriate positive value (e.g., 12 volts) and that the conductor 20 is grounded in the absence of a weld signal.

Since the weld signal appears at the beginning of the weld interval, the delayed firing circuit will be effective during the first half cycle of the line frequency, only, to prevent firing of either of the ignitrons for a preselected interval even though other elements of the circuits may indicate that welding may proceed. It is presently believed that the optimum delay period is 87½° after the zero degree point of the sine wave of the source S1 at which the weld signal is applied to conductor 20. This interval may be varied to accommodate variations in the power factor of the load by suitable adjustment controls. It is desirable, however, that the magnitude of the delay be quite precisely selectable so that the system provides extremely precise timing of the interval between the application of an appropriate potential to the weld line 20 (at the zero degree point) and the instant at which the firing circuits are enabled to fire during the first one-half cycle of operation.

It should be noted that this delayed firing system does not necessarily cause firing of the ignitrons but merely establishes a minimum firing angle for the first half cycle, and that after the first half cycle of any weld, it is ineffective to interfere with the free selection of the firing points of the ignitrons.

The heat control circuit selectively controls the firing angles of the ignitrons IG1 and IG2 to control the percent heat and hence the magnitude of the energy delivered to the workpiece WP. In general, the heat control has a capacity to produce firing of those ignitrons at any selected phase angle provided the other conditions established by the circuitry are met. Among those other conditions, of course, in the illustrated arrangement, is that if the heat control be set to fire the ignitrons at a phase angle less than a selected value in the order of 87½°, no such firing will occur during the first half cycle of the weld until after that minimum delay angle which is established by the delayed firing system.

The ignitron anode voltage sensing equipment serves to overcome that which has been a serious disadvantage of separate excitation types of firing systems. The apparatus thus far described will function satisfactorily but is subject to possible misfiring with highly inductive loads. Thus, if the load current trails the load voltage due to the inductive reactance of the load, the ignitron which is fired during one-half cycle may continue to conduct even though the phase of the line voltage has reversed. Under this circumstance the voltage across the second ignitron may not rise sufficiently to permit firing of that ignitron until some time after the line voltage itself actually switches polarity. If this condition exists, it is possible for the system to misfire since the self-excitation firing system would discharge capacitor 20C or 21C into the ignitor circuit at the appropriate time even though the anode voltage of the associated ignitron may not have risen sufficiently to permit firing, and it is possible for the energy stored in the capacitor to be fully dissipated before the anode voltage rises adequately to permit conduction in the ignitron. The ignitron anode voltage sensing system obviates this possible malfunctioning.

Upon the closure of the no-weld control switch NWCR (FIG. 1) primary winding T5P is connected between the anodes of the two ignitrons IG1 and IG2 in series with a pair of protective fuses. The voltage across that winding will therefore vary in accordance with the difference between the voltages at the anodes of the two ignitrons. When the anode voltage of either ignitron rises with respect to the other, a voltage is induced across the secondary winding T5S, and the ignitron anode voltage sensing control transfers the voltage on lead 12 from positive 12 volts essentially to ground potential. This voltage is applied to the bases of transistors Q17 and Q19 to enable both of those driving circuits to actuate their associated firing circuit. However, this does not occur until the voltage between the anodes of the two ignitrons has actually changed and been sensed so as to prevent the above noted misfiring.

The aforenoted firing control system thus is subject to the control of the delayed firing control at the initiation of the welding cycle and thereafter applies a series of weld pulses at a rate of 120 c.p.s. when a 60 cycle source is employed, each pulse being controlled by the ignitron anode voltage control, the lead-trail control and the heat control. The weld timer normally terminates the series of weld pulses. For example, if a weld requires 20 pulses in its heat cycle the timer is adjusted so that at the end of the twentieth pulse it inhibits the firing of the driving circuits comprising transistors Q17 through Q20 to stop the application of pulses through the ignitrons by applying ground to lead 20 to cause delayed firing control to issue a positive voltage signal, e.g. effectively 12 volts, on lead 10 to the driving circuits. Thereafter, in the usual welding cycle the welding electrodes are maintained under pressure against the work for a suitable interval and then released so that a new work piece area can be positioned between the electrodes for the next weld cycle.

The override circuit comprising transistors Q24 through Q28 will stop the application of welding pulses by disabling the firing circuits of ignitrons IG1 and IG2 and will release the electrodes from the work piece in the event welding continues beyond a predetermined point at which time a somewhat greater number of weld pulses than that set on the weld timer have been applied. At the initiation of the weld cycle the delayed firing control transferred the potential on lead 10 from a positive level, e.g. 12 volts, effectively to ground. This signal enables the driving circuits of transistors Q17 to Q20 and initiates timing in the override circuit by permitting transistor Q24 base to assume ground potential so that it is transferred from conduction at its saturation level to cut off. Initially the positive voltage on lead 10 is applied through resistor 111R to the base of transistor Q24 while its emitter is grounded and its collector is connected through load resistor 114R through normally closed override reset switch SW3 to a suitable source of positive potential. Lead 51 connected a suitable AC voltage through rectifier 41RE grounded condenser 31C, resistor 112R and breakdown on zener diode 2BD to lead 52 supplies lead 52 with a negative voltage at the breakdown value of diode 2BD, e.g., −12 volts so that this voltage is imposed through base resistor 113R of high resistance with respect to 111R.

While transistor Q24 conducts, its collector is effectively at ground and rectifier 43RE is forward biased so that the emitter of unijunction transistor 3UJ is essentially at ground since resistor 115R is of low resistance with respect to resistors 130R and 11VR. Upon cut off of Q24 its collector is biased positive to reverse bias rectifier 43RE and initiate the charging of condenser 32C from positive source 53 at a rate determined by the value of the resistors 11VR and 130R and condenser 32C. Resistor 11VR is variable and the parameters of this circuit are so chosen that it tracks with a suitably coupled weld timer control represented as controlling the "weld" and "stop weld" signals to lead 20 by the block in the upper part of the drawing, in a manner such that the time required for the plate of condenser 32C connected to unijunction 3UJ emitter to reach the voltage at which its negative resistance characteristic is initiated is somewhat in excess of the interval established by the seting of the weld timer control to apply a positive signal on lead 10. Thus if the weld timer were set for 20 pulses of weld current or ⅙ of a second the condenser 32C should charge to the voltage of negative resistance for the emitter of the unijunction in for example 24 pulses of weld current or ⅕ of a second. Similarly, if the timer were set for 40 pulses or ⅓ of a second the resistor 11VR should establish a charging rate which will cause the condenser 32C potential to initiate negative resistance characteristics in the unijunction in some longer interval such as ⅗ second so that no more than 45 pulses are applied if the timer fails to stop the pulsing. It will be noted that a constant ratio may but need not be kept between the number of pulses set on the weld timer and the number of pulses permitted by the charging interval for condenser 32C. However, it is essential that the charging interval exceed the weld time interval at all settings to insure that under normal operations the weld timer maintains control of the welding apparatus. The amount by which the override interval exceeds the heat interval defined by the welder should be limited by considerations of safety, economy and weld quality, usually a differential of 2 to 6 pulses should be maintained.

When the emitter of unijunction 3UJ is raised to that potential which institutes the negative resistance characteristics of the unijunction, condenser 32C discharges through the unijunction and resistor 117R to apply a positive pulse through resistor 118R to the base of transistor Q25. Transistor Q25 is connected in a bistable flip flop circuit with transistor Q26 so that ordinarily Q25 is non-counducting and Q26 is conducting. This state is assured at the time a positive voltage is initially applied to lead 54 by condenser 33C which is of sufficiently low value to provide a short time constant with respect to that of condenser 32C yet sufficient to exceed any stray capacitance effects which might permit application of a firing voltage to the base of transistor Q25 ahead of its passage of such a voltage to the base of transistor Q26. Further resistor 123R connected to the base of Q26 is of a higher value than resistor 119R connected to the base of Q25 so that the stable state voltage applied to the base of Q26 is more positive.

The firing of Q25 carries it to saturation reducing the voltage developed across 123R and applied to transistor Q26 by effectively to ground to cut off conduction therein and raise its collector connected through load resistor 124R to lead 54, to a positive voltage. This voltage is applied to the base of Q25 through resistor 121R to hold Q25 conducting at the saturation level after 32C had discharged. In the conducting state, Q25 holds ground on the collector of transistor Q25 through resistance 118R to hold it cut off.

The positive potential on the collector of Q26 is applied through rectifier 44RE to lead 10 and through resistors 48R and 54R so that ignitron firing is inhibited by the disabled driving circuits. This is accomplished by the positive signal to the bases of transistors Q17 and Q19 such that ignitron firing pulses are no longer triggered by pulses at the primaries of pulse transformers T3 and T4. That positive potential is also applied through resistor 125R to the base of transistor Q27 to cause it to conduct at saturation thereby actuating through rectifier 45RE the valve control causing a solenoid operated valve, not shown, which applies welding pressure to the welding electrodes on the work piece WP to release that pressure.

PNP transistor Q28 which normally is conducting with its emitter grounded, its base only slightly above ground, and its collector connected to a negative source of voltage through rectifier 40RE, resistor 129R and capacitor 30C is cut off by the positive potential on the collector of Q27 to cause a negative potential to be developed at its collector and across the override indicator lamp L. The lighting of this lamp indicates that the override circuit has functioned and that an override reset must be accomplished before further welding operations can be performed.

The override circuit can be reset by momentarily opening switch SW3 to remove the source of positive voltage from lead 54. Upon opening that switch conduction ceases in transistors Q24 to Q28. Restoration of switch SW3 causes transistor Q26 to conduct at its saturation level and if a positive potential is applied to lead 10 by the delayed firing control causes transistor Q24 to conduct. Transistor Q26 applies a positive potential to the base of transistor Q28 causing it to conduct and thereby shunt lamp L to ground so that it remains dark. In this condition the override circuit is restored to limit the application of weld heat in the event the other controls fail.

In normal operation the override circuit is reset automatically at the moment the weld operation is terminated since the weld timer imposes a positive voltage on lead 10 at that instant. This voltage is applied through resistor 111R to transistor Q24 base and causes that transistor to conduct at saturation so that condenser 32C discharges through rectifier 43RE, the low resistance 115R, and the collector-emitter circuit of transistor Q24 to ground. Thus at the initiation of each weld heat cycle condenser 32C is fully discharged and prepared to accurately define the override interval.

It is to be understood that the above described embodiment of this invention is offered as merely illustrative thereof and not in a limiting sense. It is evident, therefore, that modifications can be made within the skill of the art without departing from the spirit or scope of the invention.

Having described the invention, I claim:

1. A control for apparatus having a variable cycle for a given function, means for inhibiting the performance of said function by said apparatus, a cycle definer for said apparatus defining a variable cycle for said function, and means responsive to the completion of definition by said definer for actuating said inhibiting means comprising an override cycle definer defining limits in said cycle for said function which are variable with and exceed said variable cycle as defined by said cycle definer through a range of adjustment of said cycle definer, means initiating the operation of said override cycle definer when said inhibiting means is disabled, means resetting the override cycle definer when said inhibiting means is enabled prior to the definition of said override cycle limits, and means enabling said inhibiting means in response to the definition of said override cycle limits.

2. A combination as set forth in claim 1 including means for maintaining said inhibiting means enabled in response to the definition of said override cycle limits and means for releasing said maintaining means in response to manual activation.

3. A control for a welder having a variable heating cycle interval comprising means to define said heating cycle interval, means to generate a first signal in response to the initiation of said heating cycle by said defining means, an override timer defining an interval which is variable with and exceeds said heating cycle interval through a range of cycle intervals, means initiating definition of an interval by said override timer in response to said first signal, means resetting the interval defined by said override timer in response to the termination of a heating cycle, and means to terminate said heating cycle upon expiration of the interval defined by said override timer.

4. A combination as recited in claim 3 wherein said override timer comprises a timing capacitance and a translator responsive to a predetermined potential across said capacitance, and said terminating means comprises a bistable flip-flop circuit triggered from a first to a second state upon said response of said translator.

5. A control for a welder having a heating means, inhibiting means for said heating means, means to disable said inhibiting means to initiate a heating cycle, a heating cycle timer defining a variable cycle interval, and means responsive to the termination of said cycle interval for issuing an enabling signal to said inhibiting means, comprising an override timer defining an interval which is variable with and exceeds said heating cycle interval through a range of cycle intervals, means initiating the operation of said override timer when said inhibiting means is disabled, means resetting the interval defined by said override timer when said inhibiting means is enabled prior to the expiration of the interval defined by said override timer, and means enabling said inhibiting means upon expiration of the interval defined by said override timer.

6. A control for a welder having a heating means, inhibiting means for said heating means, means to disable said inhibiting means to initiate a heating cycle, means for defining a variable heating cycle and means responsive to the termination of said cycle definition for issuing an enabling signal to said inhibiting means comprising a heating cycle override definer defining a cycle which is variable with and extends beyond said heating cycle over a range of heating cycles, means initiating the operation of said override definer when said inhibiting means is disabled, means resetting said override definer when said inhibiting means is enabled prior to the completion of definition of an override cycle, and means enabling said inhibiting means upon completion of definition of an override cycle.

7. A welding control having a pair of anti-parallel connected unidirectional current conducting devices actuable in response to input signals to connect a source of alternating current to a load circuit, the combination of a separate-excitation firing circuit means for each of the unidirectional current conducting devices each comprising a source of energy and controllable means effective when actuated for applying a pulse of energy from said source of energy to the input circuit of the associated unidirectional current conducting device, an actuating means individual to each of said controllable means for selectively actuating the associated controllable means, inhibiting means for inhibiting the two said actuating means to actuate the associated controllable means, weld signal means for disabling said inhibiting means, a weld timer for defining a variable weld heating interval and enabling said inhibiting means at the end of said interval, an override timer for defining an override interval variable with and exceeding said weld heating interval over a range of weld heating intervals, means to initiate timing of said override timer in response to the disabling of said inhibiting means, means to reset said override interval in response to the enabling of said inhibiting means prior to expiration of said override interval, and means to enable said inhibiting means in response to the expiration of said override interval.

8. A combination as set forth in claim 7 including means to maintain said inhibiting means enabled following expiration of said override interval, and manual reset means for said maintaining means.

9. A combination as set forth in claim 7 including a welding electrode, engageable with a work piece, means for applying pressure between said welding electrode and said work piece for an interval defined by said weld heat timer, and means responsive to the expiration of said override interval for releasing pressure between said welding electrode and said work piece.

10. A combination as set forth in claim 7 including means for performing a second welding function for an interval defined by said weld heat timer, and means responsive to the expiration of said override interval for terminating said second function.

11. A combination as set forth in claim 5 wherein said override timer comprises a timing capacitance and a semi-conductive translator responsive to a predetermined potential across said timing capacitance, and said means to enable said inhibiting means upon expiration of the interval defined by said override timer comprises a bistable flip-flop triggered from a first to a second state upon response of said semi-conductive translator.

12. A combination as set forth in claim 5 wherein the active control elements in said weld heat timer include semiconductive translators capable of failing in a conductive state.

13. A control for apparatus performing a given function, including means defining a time cycle of operation of said apparatus to perform said given function in a predetermined interval; means for adjusting said time cycle defining means to vary said cycle interval; means for initiating operation of said time cycle defining means; an override timer to define an override interval; means for initiating operation of said override timer in response to said initiating means for said time cycle defining means; means for adjusting said override timer to vary the override interval; means coupling said time cycle adjusting means to said override timer adjusting means to vary said override timer adjusting means with said time cycle adjusting means to maintain throughout all values of said time cycle interval an override interval exceeding said time cycle interval; means responsive to the termination of operation of said means defining a time cycle of operation for resetting said override timer; and means for inhibiting operation of said apparatus in response to the complete definition of an override interval by said override timer.

14. A combination according to claim 13, including means responsive to the operation of said inhibiting means for maintaining said inhibiting means effective to inhibit operation of said apparatus; and a manually actuated reset means for disabling said inhibiting means.

References Cited

UNITED STATES PATENTS

| | | | |
|---|---|---|---|
| 2,676,230 | 4/1954 | Czaja | 219—114 |
| 2,710,326 | 6/1955 | Collom | 219—114 |
| 3,114,079 | 12/1963 | Sofianek et al. | 317—36 X |

RICHARD M. WOOD, *Primary Examiner.*

B. A. STEIN, *Assistant Examiner.*